(12) United States Patent
Morovic et al.

(10) Patent No.: US 10,452,055 B2
(45) Date of Patent: Oct. 22, 2019

(54) CONVERTING AT LEAST A PORTION OF A 3-D OBJECT INTO A FORMAT SUITABLE FOR PRINTING

(71) Applicants: HEWLETT-PACKARD DEVELOPMENT COMPANY, L.P., Houston, TX (US); Peter Morovic, Sant Cugat del Valles (ES); Jan Morovic, Colchester (GB)

(72) Inventors: Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 178 days.

(21) Appl. No.: 15/517,370

(22) PCT Filed: Oct. 29, 2014

(86) PCT No.: PCT/EP2014/073233
§ 371 (c)(1),
(2) Date: Apr. 6, 2017

(87) PCT Pub. No.: WO2016/066193
PCT Pub. Date: May 6, 2016

(65) Prior Publication Data
US 2017/0246812 A1  Aug. 31, 2017

(51) Int. Cl.
*G05B 19/4099* (2006.01)
*H04N 1/405* (2006.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
None
See application file for complete search history.

(56) References Cited

U.S. PATENT DOCUMENTS 5,706,105 A  1/1998 Naylor
7,589,868 B2  9/2009 Velde et al.
(Continued)

OTHER PUBLICATIONS

Wonjoon Cho; "Halftoning for 3DP"; MIT Confidential; Mar. 10, 1999; http://deslab.mit.edu/DesignLab/people/cho/secure-doc/sff-conso-3.pdf.

*Primary Examiner* — Jason A Pringle-Parker
(74) *Attorney, Agent, or Firm* — HP Inc. Patent Department

(57) ABSTRACT

At least a portion of a 3-D object is converted into a format suitable for printing. A material volume coverage vector for each voxel of a 3-D bit map of a 3-D object is determined. The 3-D bit map comprises a plurality of voxels, each voxel located at a unique 3-D location. A rectangular cuboid comprising an M×N×L array of voxel locations enclosing at least a portion of the 3-D object is determined. A halftone threshold matrix comprising an array of threshold values is provided. The halftone threshold matrix is converted to provide an M×N×L 3-D array of threshold values. Each material volume coverage vector of the at least a portion is compared with each threshold value at corresponding 3-D locations to select a printable voxel at each 3-D location to convert the at least a portion of the 3-D object into a format suitable for printing.

20 Claims, 3 Drawing Sheets

(51) Int. Cl.
  *H04N 1/60*    (2006.01)
  *B33Y 50/00*   (2015.01)
  *G06T 19/00*   (2011.01)
  *B29C 64/386*  (2017.01)

(52) U.S. Cl.
  CPC ............ *G06T 19/00* (2013.01); *H04N 1/405* (2013.01); *H04N 1/605* (2013.01); *G05B 2219/49023* (2013.01)

(56) References Cited

U.S. PATENT DOCUMENTS

| | | |
|---|---|---|
| 7,889,390 B2 | 2/2011 | Wang |
| 8,705,144 B2 | 4/2014 | Gullentops et al. |
| 9,999,509 B2* | 6/2018 | Dikovsky .......... A61C 13/0019 |
| 10,061,870 B2* | 8/2018 | Nelaturi ................. G06F 17/50 |
| 2004/0183796 A1* | 9/2004 | Velde ........................ B41C 1/00 345/419 |
| 2005/0072113 A1 | 4/2005 | Collins et al. |
| 2009/0020901 A1* | 1/2009 | Schillen ................. B29C 70/88 264/31 |
| 2010/0195122 A1* | 8/2010 | Kritchman ............. G05B 15/02 358/1.9 |

* cited by examiner

CONVERTING AT LEAST A PORTION OF A 3-D OBJECT INTO A FORMAT SUITABLE FOR PRINTING

BACKGROUND

Some printing processes, for example, that generate three-dimensional (3-D) objects, convert a model of a 3-D object into a format suitable for printing. A printable format may, for example, be a format that represents portions or aspects of the 3-D object by a plurality of units of material or units of a combination of material, for example, dots which can be printed by drops of a fluid. For example, in the generation of 3-D objects, generated by an additive manufacturing process, layers of the 3-D objects are formed by building up corresponding layers of a build material. In one example of additive manufacturing, the object is generated on a layer-by-layer basis by coalescing and solidifying portions of a layer of build material. In one example the build material may be in the form of a powder, fluid or sheet material. The correct coalescence and solidification is achieved by printing onto the layer of the build material an agent. The layer is heated and the build material which is coated with the agent coalesces and solidifies upon cooling.

BRIEF DESCRIPTION OF DRAWINGS

For a more complete understanding, reference is now made to the following description taken in conjunction with the accompanying drawings in which.

DETAILED DESCRIPTION

The physical properties of the solidified build material can be altered by the addition of other agents (for example, a coalescence modifier agent) in combination with a coalescing agent or in place of. For example, the additional agents may provide a more rigid structure for the outer portions of the 3-D object. The agent(s) may be in fluid form and printed on the surface of the build material in drops forming dots of the agents on the surface of the build material. Color inks or, agents that are colored, may also be printed onto portions of the surface of a build material, for example, the outer portions of the build material, that are to be solidified, in order to provide surface decoration onto the 3-D object. These color inks or color agents may also be in fluid form and, as in the case of the fluid agent(s), printed onto a portion of the build material in drops which also form dots on the surface of the build material.

One technique of transforming a continuous tone image into a printable format is halftoning. Halftoning techniques can be used on a sliced 3-D object to transform it into a format suitable for printing by generating the halftone content consisting of drops or amounts of ink or agent(s) at every pixel location for each slice. Typically, the whole halftoning process is done on a per-slice basis in which the 3-D object is sliced into individual 2-D images representing a slice of the 3-D object.

Since the halftoning for 3-D printing involves a fundamentally 2-D treatment of each slice this makes it harder to take cross-plane dependencies, that is, dependencies e.g. influences between pixel elements of neighboring slices, into account but also potentially results in a throughput limitation.

Figure 1:
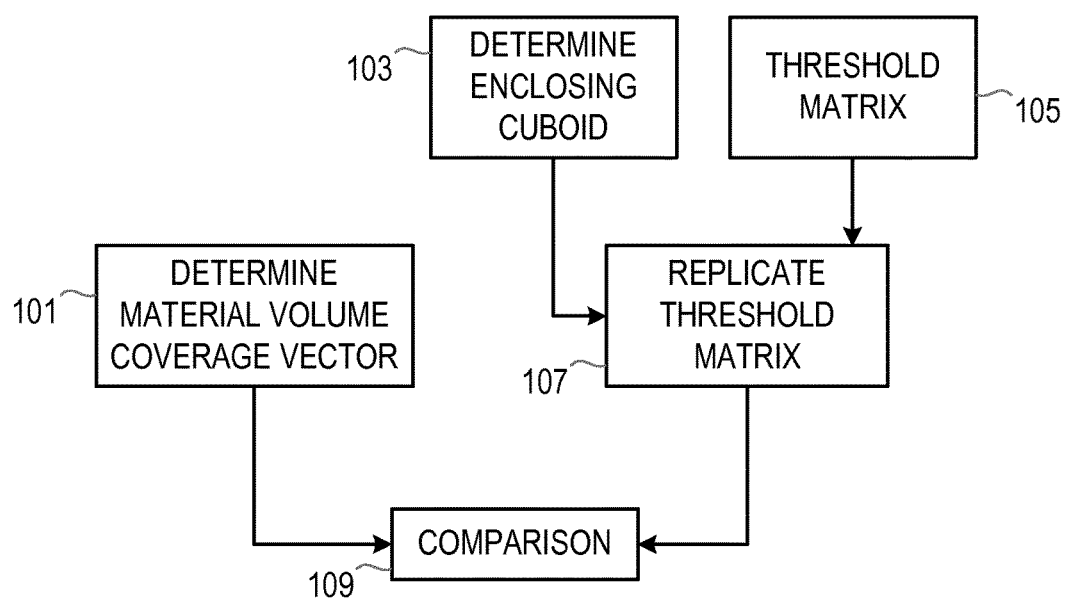
FIG. 1 is a flowchart of an example of a method of converting at least a portion of a 3-D object into a format suitable for printing.

In the example shown in FIG. 1, a printable version of at least a portion of a 3-D object is obtained. A material volume coverage vector for each voxel (3-dimensional pixel) of a 3-D bit map of a 3-D object is determined, 101. The 3-D bit map comprises a plurality of voxels, each voxel located at a unique 3-D location. An example of a material volume coverage vector would be to determine the amount of each material (for example coalescing agent, coalescence modifier agent or color ink), their combination and overprint if needed as proportional volume coverage values. For example [K:0.2, Z:0.8] could be 20% likelihood of voxel being a coalescing agent, being placed at that location and an 80% likelihood of being left blank, or [K:0.1, W:0.1, Z:0.8] could represent 10% likelihood of a voxel location being black ink, 10% would be a coalescing material and 80% left blank.

A rectangular cuboid comprising an M×N×L array of voxel locations which encloses at least a portion of the 3-D object is determined, 103. In one example, the M×N×L rectangular cuboid encloses the whole 3-D object. In another example, the M×N×L rectangular cuboid encloses a portion of the 3-D object. As it encloses at least a portion of the 3-D object, it includes all of the voxels of the 3-D bit map of that at least a portion of the 3-D object. A halftone threshold matrix comprising an array of threshold values is provided, 105. The provided halftone threshold matrix may comprise a 2-D array of threshold values, or alternatively, a 3-D array of threshold values. The halftone threshold matrix is then replicated, 107, to provide an M×N×L 3-D array of threshold values. Each material volume coverage vector is then compared, 109, with each threshold value of the replicated 3-D halftone threshold matrix at corresponding 3-D locations to select a printable voxel at each 3-D location for generating the printable version of the at least a portion of the 3-D object. A voxel at a 3-D location comprises, for example, the data to enable that location in 3-D space to be printed.

Figure 2:
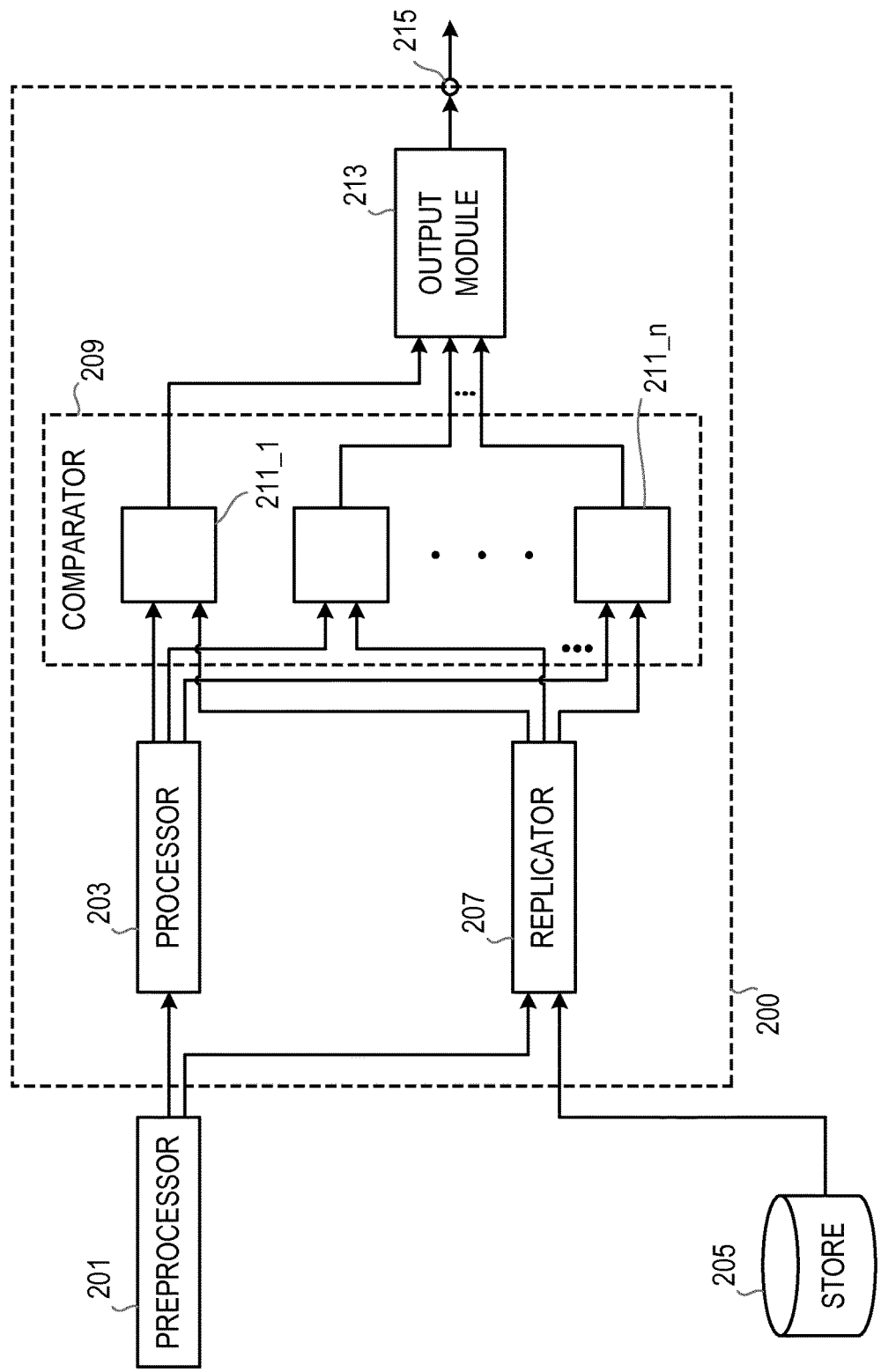
FIG. 2 is a simplified schematic of an example of apparatus for converting at least a portion of a 3-D object into a format suitable for printing.

With reference to FIG. 2, apparatus 200 for converting at least a portion of a 3-D object into a format suitable for printing is illustrated. The apparatus 200 comprises a processor 203 to determine a material volume coverage vector for each voxel of the 3-D bit map of a 3-D object. The processor 203 also determines a rectangular cuboid comprising an M×N×L array of voxel locations. The rectangular cuboid encloses at least a portion of the 3-D object. The apparatus 200 also comprises a replicator 207 to replicate the halftone threshold matrix to provide an M×N×L 3-D array of threshold values. The halftone threshold matrix which is to be replicated by the replicator 207 may be provided as a predetermined matrix output from a storage device 205. The apparatus 200 further comprises a comparator 209 to compare each material volume coverage vector with each threshold of the replicated 3-D halftone matrix at corresponding 3-D locations to select a printable voxel at each 3-D location to convert the at least a portion of the 3-D object into a format suitable for printing.

In more detail, the output of the processor 203 is provided on a first input of a comparator 209 and the output of the replicator 207 is provided on a second input of the comparator 209. In an example, the comparator 209 may comprise a plurality of comparator units 211_1 to 211_n connected in parallel. The inputs of each comparator units

211_1 to 211_$n$ of the comparator 209 is provided with a threshold value of the replicated 3-D halftone threshold matrix at a location and the material volume coverage vector at the voxel location corresponding to the matrix location of the threshold value provided on the other input. Each comparator unit 211_1 to 211_$n$ compares a material volume coverage vector at a voxel location with a threshold value of the replicated 3-D halftone threshold matrix at the corresponding 3-D location.

The output of each comparator unit 211_1 to 211_$n$ comprises selected printable voxel at each voxel location and these are then assembled in the output module 213 to provide a printable version of at least a portion of the 3-D object on the output terminal 215 of the apparatus 200.

The process may then be repeated for each portion of the 3-D object to output a printable version of the entire 3-D object.

The number of comparator units 211_1 to 211_$n$ may be equal to the number of voxel locations of the M×N×L cuboid. The comparison can then be carried out substantially simultaneously. Alternatively, the number of comparator units 211_1 to 211_$n$ may equal a portion of the voxel locations of the M×N×L cuboid and the comparison is then repeated for each portion of the voxel locations until all of the voxel locations of the M×N×L cuboid have been compared.

The apparatus 200 is connected to the output of a pre-processor 201. In the example shown in FIG. 2, the pre-processor 201 is external to the apparatus 200. In another example, the pre-processor 201 may be an integral part of the apparatus 200. The pre-processor 201 carries out a number of pre-processing steps (described in more detail below) and provides on its output a 3-D map representation of the 3-D object to be generated. The 3-D map representation is then provided on the input of the processor 203.

The replicator 207 is also connected to a storage device 205 which provides a predetermined 2-D halftone threshold matrix to the replicator 207. The predetermined 2-D matrix comprises, for example, a dispersed-dot type matrix such as white-noise, blue-noise, or clustered-dot type matrix such as green-noise, AM-screen like pattern, or the like. In another example, the storage device 205 stores a predetermined 3-D halftone threshold matrix which is provided to the replicator 207.

In one example, a 3-D object is to be generated by an additive manufacturing technique. The object shape and its properties are defined within an object model. The object model may have portion having different properties such as, for example, object porosity properties, inter-layer strength properties, object elasticity properties, density and the like. The object model may also define portions having different colors such as the outer portions to provide surface decoration. The properties and resultant colors may depend on the type of materials used for the build material or the agents and fluids used to generate the object.

Figure 3:
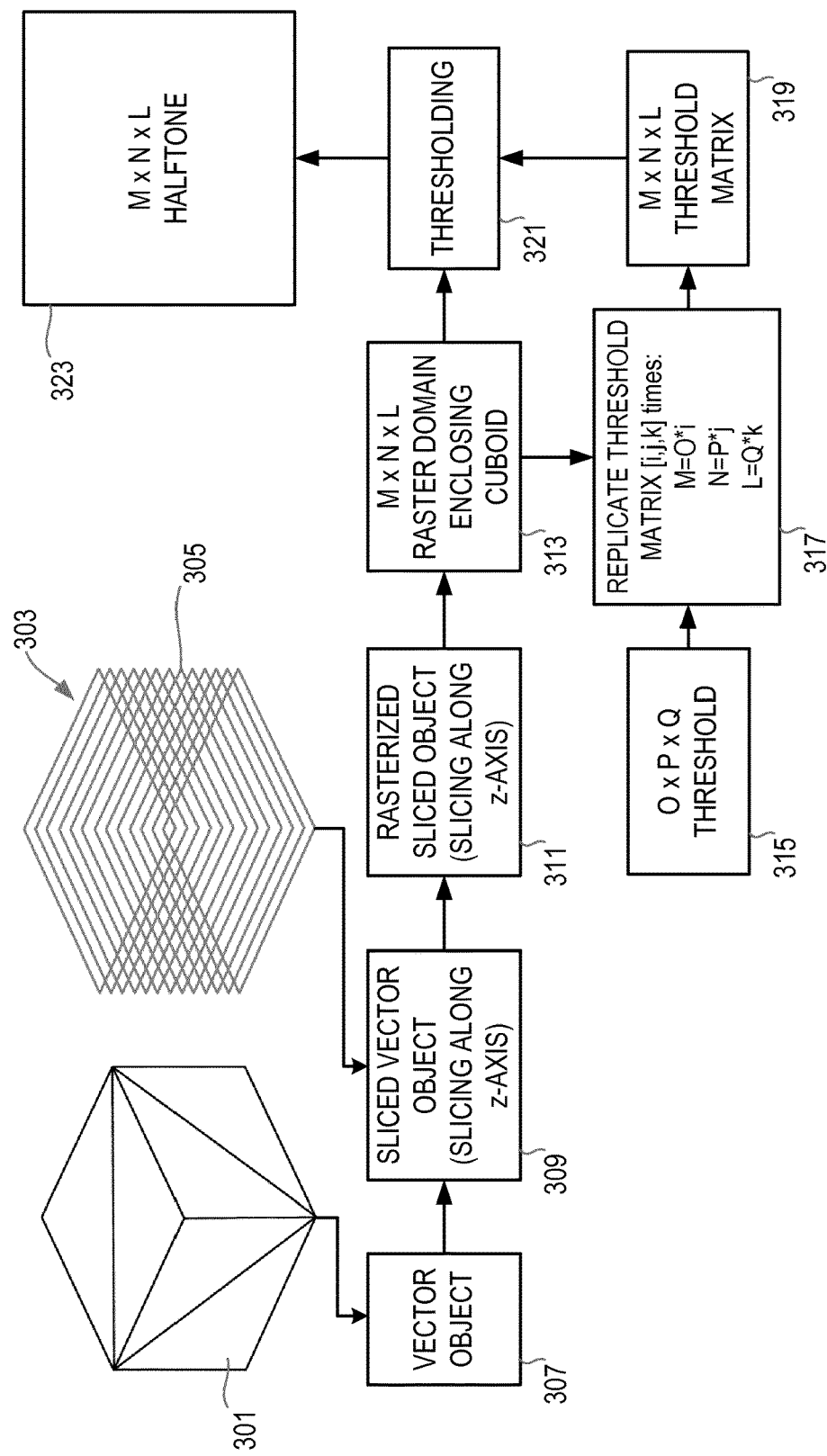
FIG. 3 is an example of the method of FIG. 1 in more detail.

In the example shown in FIG. 3, the object model 301 is defined, 307, as a vector image in 3-D. In the Figure, the object model 301 has been illustrated in a simplified form of a cube. However, it can be appreciated that this is for illustrative purposes and that the object model may comprise any form of 3-D object of varying degrees of complexity. The vector object 301 is sliced, 309, to generate a sliced 3-D object 303. The 3-D object is sliced, 309, into as many slices 305 as will be needed or will be used for 3-D printing in generating a 3-D object by an additive manufacturing technique. The vector slices 305 are made along the z-axis such that the x-y axes define the plane of each slice 305. The number of slices depends on several factors, for example, the type of build material, type of coalescing agent, type of coalescence modifier agent(s) used, their thickness per layer to provide the properties and/or finish etc.

Every vector slice 305 is rasterized, 311, to provide a 3-D map representation of the object model comprising a plurality of voxels with color/material values at every voxel location [x, y, z].

The enclosing rectangular cuboid of the object is determined, 313. This may be denoted by its width, depth and height as M, N and L so that the rectangular cuboid is of size [M×N×L].

Next, a halftone threshold matrix that is of size [O×P×Q] is provided, 315. The generated halftone threshold matrix may comprise a 3-D array of threshold values or a 2-D array of threshold values.

In one example, the halftone threshold matrix comprises a 2-D array of threshold values, i.e. Q=1. The 2-D halftone matrix contains a 2-D array of threshold values. In one example, the threshold values are for carrying out a halftone operation that compares a value of the threshold matrix against a value of a Material (such as an agent(s)) or Color Probability distribution such as an NPac (Neugebauer Primary Area Coverage) and chooses a single 'state'—material or ink-combination based on the threshold value. This matrix may be designed in a number of ways with a key parameter being the number of 0 values over the x-y plane. This is determined by the total area coverage across all colorants and materials required per slice. In another example, the halftone threshold matrix is a full, native 3-D matrix of size [O×P×Q] (Q≠1, i.e. having O*P*Q threshold values) so that threshold value choices are made in 3-D. A voxel, that contains a Material volume coverage vector, of the M×N×L cuboid is directly compared against a threshold value at the same [x, y, z] voxel location in the threshold matrix. In this case it is directly applied as-is and allows natively for dynamic area coverage treatment.

The generated [O×P×Q] 3-D halftone threshold matrix can also be constructed with optimized, fixed area coverage in mind whereby along the z-axis constant area coverage is obtained. This can have some complementarity and can be built from an essentially natively 2-D threshold matrix. If such a matrix (that has O×P and at every height value there is a constant frequency distribution of states of a given, predetermined area-coverage level, e.g. at every height value there is a 10% area coverage over the width and height) is used then a 2-D matrix conversion occurs whereby the generation along the z-axis effectively becomes a modulo operation whereby if the height is L it only needs to be replicated L/Q times.

In this way complementarity of the halftone threshold matrix can be provided in which a drop of the material (e.g. agent or ink) is not placed at the same location twice. This is achieved, in replicating each subsequent 2-D array of values along the z-axis the non-zero threshold values are in complementary spatial location (i.e. no none-zero threshold values are at the same [x,y] location between levels $z_i$ and $z_{i+1}$.

A native 2-D halftone threshold matrix, like those used in 2-D printing, e.g. [O×P] matrix of threshold values, can also be used to generate a 3-D halftone threshold matrix. This may be achieved, for example, if the matrix has 10-bit values and the desired area coverage per slice is 10%, then the original 2-D matrix is converted to a [O×P×10] matrix such that every one of the 10 z-level planes contains a 10% area coverage. These 10 levels then have to be replicated ~Q/10 times so as to have a [O×P×Q] 3-D halftone threshold matrix. If planes don't have fixed area coverage but varies within the plane then this variation can be taken into account, at the point of constructing and replicating the 3-D halftone threshold matrix. This may be performed on a 2-D threshold matrix that natively has 'continuous tone' threshold values and which can be easily formatted to have local variability in terms of the area coverages. The same applies if different levels require different area coverages; again a variable tiling/replication can be used.

The generated halftone threshold matrix is then replicated (or tiled), 317, in all three dimensions so that the tiled, replicated matrix matches the size of the enclosing rectangular cuboid of the 3-D object. In one example, the generated 3-D halftone matrix is replicated (repeated) until it fills the M×N×L cuboid. In another example, multiplying factors, i, j, k are computed such that M=O*i, N=P*j and L=Q*k (in the example where Q=1, 2-D matrix case, L=k). The replicated M×N×L 3-D halftone threshold matrix is output, 319.

Each material volume coverage vector of the 3-D object and a corresponding threshold value is compared, 321 in a simple comparison thresholding operation to output, 323, a printable version of the 3-D object or a printable version of a portion of the 3-D object. For example, if, say, the threshold value is X, then it is a matter of determining where X falls in the material volume coverage vector values (i.e. if X is 12 and the material volume coverage vector has proportional volume coverage for 2 materials, the first of which has volume coverage 10 the second of which 90, then since 12>10, only the second material is placed at that voxel location.

Since the rectangular cuboid and the replicated 3-D halftone threshold matrix are the same size, and since there is no dependence and since the operation performed here is the one outlined above: a comparison of threshold value against the material volume coverage vector, for example, the material/colorant probability distribution at every [x, y, z] voxel location of the object enclosing cuboid, the comparison operation can be performed on the entire cuboid in one go.

The resulting system can operate at high speeds and is merely constrained by the number of comparator units. The threshold matrix can be appropriately replicated beforehand—e.g. a full 3-D [M×N×L] matrix for the entire print-plane can be pre-computed off-line and a sub-cuboid that relates to the 3D-object to be printed is used on-line. Then, if there are as many comparator units as there are 3-D voxels and sufficient memory to hold them, the entire process can be done in a single-shot/cycle, i.e. substantially simultaneously e.g. on a (group of) GPU. In more constrained cases where processing cores and memory of each comparator unit are limited, the image can be processed in parts, without concerns as to their sequence/location.

The halftoning operation may be performed in a single shot with full independence of both x,y-coordinates (plane) as well as across slices (z-axis) with an increased level of parallelism which in turn allows for significant throughput gains too.

The halftoning (generating a printable 3-D object) is carried out, natively, in three dimensions rather than treating the three dimensions as a sequence of 2-D planes. This allows for pre-treating or post-treating subsequent planes at once and allows halftoning of an object to be a done in a single operation (memory and processing power permitting).

As a result, throughput/speed is increased, since any part of the object in any order can be halftoned at any time (due to the inherent independent nature of the halftoning operation). The resulting halftone of the entire object means that adjustments to it can be done in full 3D, unlike on a slice-by-slice level—this can be done on the halftoned object and/or on the expanded/replicated halftone matrix, allowing the simultaneous halftoning of multiple slices at a time.

The simplified comparison method is suitable for GPU cores (as the comparator units). Depending on the amount of memory and processing power required, the entire object can be halftoned in a single shot. Alternatively arbitrary sub-cubes or sub-regions can be treated in parallel as performance permits.

If pre-analysis of the entire 3-D object to be printed is desired in order to make adjustments to the halftoned object, this again is a suitable and fast way to pre-process an image. This can be done in a targeted way, e.g. based on information from the vector images (making sure fragile/thin parts are done in a different way, edges are treated differently, for example is manufactured such that the material is more rigid).

Further, this allows a printing system having multiple ink/agent delivery components to be utilised in which the ink/agent delivery components are fed independently and can deposit/move independently. For example, if a printing system has 4 print-heads that deposit material/ink in different spatial locations and has x-y-z-independence (i.e. they can move and grow at different rates), then they can be fed concurrently using this approach by halftoning the relevant sub-cubes needed for each part of the 3-D object printed by each of the print-heads.

It should be noted that the above-mentioned examples illustrate rather than limit what is described herein, and that those skilled in the art will be able to design many alternative implementations without departing from the scope of the appended claims. The word "comprising" does not exclude the presence of elements other than those listed in a claim, "a" or "an" does not exclude a plurality, and a single processor or other unit may fulfil the functions of several units recited in the claims.

The invention claimed is:

1. A method of converting at least a portion of a 3-D object into a format suitable for printing, the method comprising:
   (a) determining a material volume coverage vector for each voxel of a 3-D bit map of a 3-D object, each volume coverage vector specifying an amount of each of multiple materials for a corresponding voxel, the 3-D bit map comprising a plurality of voxels, each voxel located at a unique 3-D location;
   (b) determining a rectangular cuboid comprising an M×N×L array of voxel locations enclosing at least a portion of the 3-D object;
   (c) providing a halftone threshold matrix comprising an array of threshold values;
   (d) replicating the halftone threshold matrix to an M×N×L 3-D array of threshold values; and
   (e) comparing each material volume coverage vector with each threshold value of the replicated 3-D halftone threshold matrix at corresponding 3-D locations to select a printable voxel at each 3-D location to convert the at least a portion of the 3-D object into output data of a format suitable for printing; and
   (f) forming the 3-D object using the output data.

2. The method of claim 1, wherein the method further comprises repeating steps (b) to (e) for each portion of the 3-D object.

3. The method of claim 1, wherein comparing each material volume coverage vector comprises comparing at least a portion of the material volume coverage vectors with the threshold value at their corresponding 3-D locations is performed substantially simultaneously.

4. The method of claim 1, wherein providing a halftone threshold matrix comprises generating a O×P×Q 3-D halftone threshold matrix comprising a O×P×Q 3-D array of threshold values by converting a predetermined O×P 2-D halftone threshold matrix into an O×P×Q 3-D halftone threshold matrix.

5. The method of claim 4, wherein converting a predetermined O×P 2-D halftone threshold matrix comprises
determining a third dimension Q of a 3-D halftone threshold matrix based on the percentage area coverage of each 2-D slice of the 3-D object; and
generating 2-D array of threshold values for each level of the determined third dimension.

6. The method of claim 1, wherein replicating the halftone threshold matrix to provide a M×N×L 3-D array of threshold values comprises repeating the halftone threshold matrix to fill the M×N×L 3-D array.

7. The method of claim 6, wherein replicating the halftone threshold matrix to provide a M×N×L 3-D array of threshold values comprises
computing a multiplying factor for each dimension of the halftone threshold matrix to generate the corresponding dimension of the M×N×L 3-D array; and
multiplying each dimension of the halftone threshold matrix with the corresponding, computed multiplying factor.

8. The method claim 1, wherein the method further comprises
generating a 3-D bit map of a 3-D object, the 3-D bit map comprising a plurality of voxels, each voxel located at a unique 3-D location; and
the step of determining a material volume coverage vector for each voxel of a 3-D bit map comprises determining a material volume coverage vector for each voxel of the generated 3-D bit map.

9. The method of claim 8, wherein the step of generating a 3-D bit map of a 3-D object comprises
determining a vector image in 3-D of a 3-D object;
slicing the 3-D vector image into a plurality of vector slices; and
rasterizing each vector slice;
assembling each rasterized slice to generate a 3-D bit map of the 3-D object,
the 3-D bit map comprising a plurality of voxels, each voxel located at a unique 3-D location.

10. Apparatus for converting at least a portion of a 3-D object into a format suitable for printing, the apparatus comprising:
a processor to determine a material volume area coverage vector for each voxel of a 3-D bit map of a 3-D object, each volume coverage vector specifying an amount of each of multiple materials for a corresponding voxel, the 3-D bit map comprising a plurality of voxels, each voxel located at a unique 3-D location; and to determine a rectangular cuboid comprising an M×N×L array of voxel locations enclosing at least a portion of the 3-D object;
a replicator to replicate a provided halftone threshold matrix to an M×N×L 3-D array of threshold values; and
a comparator to compare each material volume coverage vector with each threshold value of the replicated 3-D halftone threshold matrix at corresponding 3-D locations to select a printable voxel at each 3-D location to convert the at least a portion of the 3-D object into a format suitable for printing;
wherein the processor is to provide the halftone threshold matrix by generating a O×P×Q3-D halftone threshold matrix comprising a O×P×Q 3-D array of threshold values by converting a predetermined O×P 2-D halftone threshold matrix into an O×P×Q 3-D halftone threshold matrix,
wherein converting the predetermined O×P 2-D halftone threshold matrix comprises determining a third dimension Q of a 3-D halftone threshold matrix based on the percentage area coverage of each 2-D slice of the 3-D object, and generating 2-D array of threshold values for each level of the determined third dimension.

11. Apparatus of claim 10, wherein the comparator comprises a plurality of comparator units connected in parallel to compare at least a portion of the material volume coverage vectors with the threshold value at their corresponding 3-D locations substantially simultaneously.

12. Apparatus of claim 10, wherein the apparatus further comprises a preprocessor to generate a 3-D bit map of a 3-D object, the 3-D bit map comprising a plurality of voxels, each voxel located at a unique 3-D location.

13. Apparatus of claim 10, wherein the replicator, when replicating the halftone threshold matrix, is to provide a M×N×L 3-D array of threshold values comprises repeating the halftone threshold matrix to fill the M×N×L 3-D array.

14. A non-transitory computer-readable storage media comprising instructions stored thereon, that when executed; direct a processor to perform a method comprising:
determining a material volume coverage vector for each voxel of a 3-D bit map of a 3-D object, each volume coverage vector specifying an amount of each of multiple materials for a corresponding voxel, the 3-D bit map comprising a plurality of voxels, each voxel located at a unique 3-D location, the material volume coverage vector indicating a likelihood that a coalescing agent will and will not be deposited in a corresponding voxel;
determining a rectangular cuboid comprising an M×N×L array of voxel locations enclosing at least a portion of the 3-D object;
replicating a provided halftone threshold matrix to an M×N×L 3-D array of threshold values; and
using the material volume coverage vector and halftone threshold matrix, outputting, to a manufacturing device, a set of output data for manufacturing the 3-D object with the manufacturing device.

15. The computer-readable storage media of claim 13, wherein the media comprises further instructions stored thereon, that when executed, direct a processor to
generate a O×P×Q 3-D halftone threshold matrix comprising a O×P×Q 3-D array of threshold values by converting a predetermined O×P 2-D halftone threshold matrix into an O×P×Q 3-D halftone threshold matrix.

16. The method of claim 1, wherein the material volume coverage vector indicates a likelihood for each of a plurality of different types of material to be deposited in a corresponding voxel.

17. The method of claim 16, wherein the different types of material comprise coalescing agent, coalescence modifier agent and colorant.

18. The method of claim 1, wherein the material volume coverage vector indicates a likelihood that a coalescing agent will and will not be deposited in a corresponding voxel.

19. Apparatus of claim 13, wherein replicating the halftone threshold matrix to provide a M×N×L 3-D array of threshold values comprises
   computing a multiplying factor for each dimension of the halftone threshold matrix to generate the corresponding dimension of the M×N×L 3-D array; and
   multiplying each dimension of the halftone threshold matrix with the corresponding, computed multiplying factor.

20. The computer-readable storage media of claim 15, the media comprises further instructions stored thereon, that when executed, direct a processor to convert a predetermined O×P 2-D halftone threshold matrix by:
   determining a third dimension Q of a 3-D halftone threshold matrix based on the percentage area coverage of each 2-D slice of the 3-D object; and
   generating 2-D array of threshold values for each level of the determined third dimension.

\* \* \* \* \*

UNITED STATES PATENT AND TRADEMARK OFFICE
CERTIFICATE OF CORRECTION

PATENT NO. : 10,452,055 B2
APPLICATION NO. : 15/517370
DATED : October 22, 2019
INVENTOR(S) : Peter Morovic et al.

It is certified that error appears in the above-identified patent and that said Letters Patent is hereby corrected as shown below:

In the Claims

In Column 7, Line 31, Claim 8, after "method" insert -- of --.

In Column 8, Line 4, Claim 10, delete "O×P×Q3-D" and insert -- O×P×Q 3-D --, therefor.

Signed and Sealed this
Thirty-first Day of December, 2019

Andrei Iancu
*Director of the United States Patent and Trademark Office*